United States Patent [19]

Isomoto et al.

[11] Patent Number: 5,363,140
[45] Date of Patent: Nov. 8, 1994

[54] VIDEO SIGNAL CONVERSION SYSTEM WITH A VERTICAL ENHANCEMENT CIRCUIT

[75] Inventors: Seiko Isomoto, Kanagawa; Toshio Sarugaku, Chiba; Hiroyuki Kawashima, Tokyo, all of Japan

[73] Assignee: Sony Corporation, Tokyo, Japan

[21] Appl. No.: 65,153

[22] Filed: May 21, 1993

[30] Foreign Application Priority Data

Jun. 23, 1992 [JP] Japan .................................. 4-163284

[51] Int. Cl.5 ................................................. H04N 7/01
[52] U.S. Cl. ..................................... 348/445; 348/458; 348/628
[58] Field of Search ................ 358/11, 140, 21 R, 160, 358/166, 167, 36, 37; 348/445, 458, 628, 625, 607; H04N 7/01, 5/14

[56] References Cited

U.S. PATENT DOCUMENTS

| | | | |
|---|---|---|---|
| 4,602,275 | 6/1986 | Smith et al. | 358/11 |
| 4,802,010 | 1/1989 | Skinner et al. | 358/166 |
| 4,864,402 | 9/1989 | Ebihara et al. | 358/160 |

Primary Examiner—Victor R. Kostak
Assistant Examiner—Nathan J. Flynn
Attorney, Agent, or Firm—Jay H. Maioli

[57] ABSTRACT

A picture signal processing circuit is composed of a picture memory, such as a field memory, having one input port for receiving an input picture signal and two distinct and independent output ports; a timing control circuit is designed to control the respective reading operations through the first and second output ports in such a manner that one output signal is shifted by one horizontal line period with respect to the other output signal, both output signals being supplied to an operating circuit, such as a vertical enhancer, for processing picture signals of a plurality of horizontal lines.

6 Claims, 4 Drawing Sheets

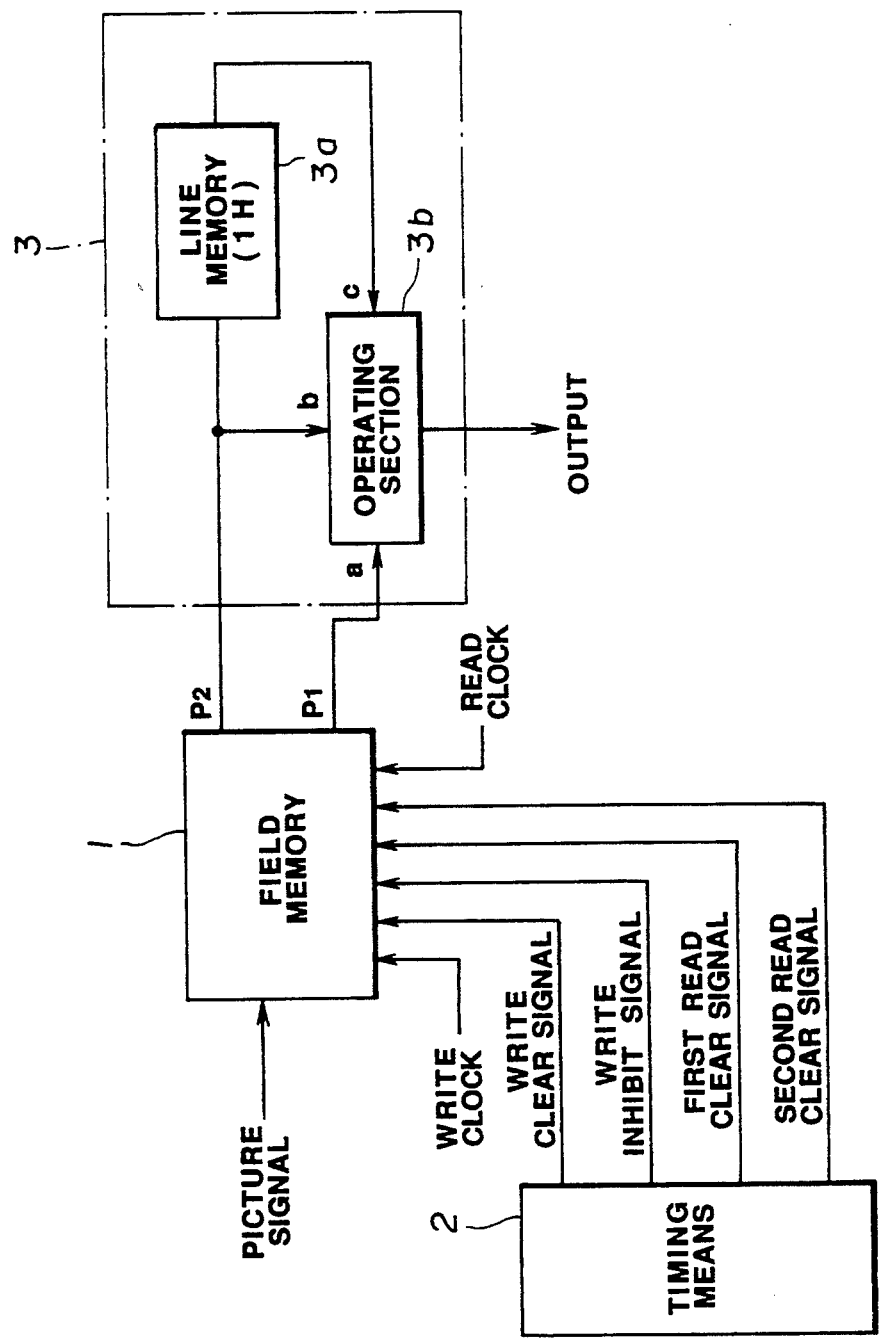

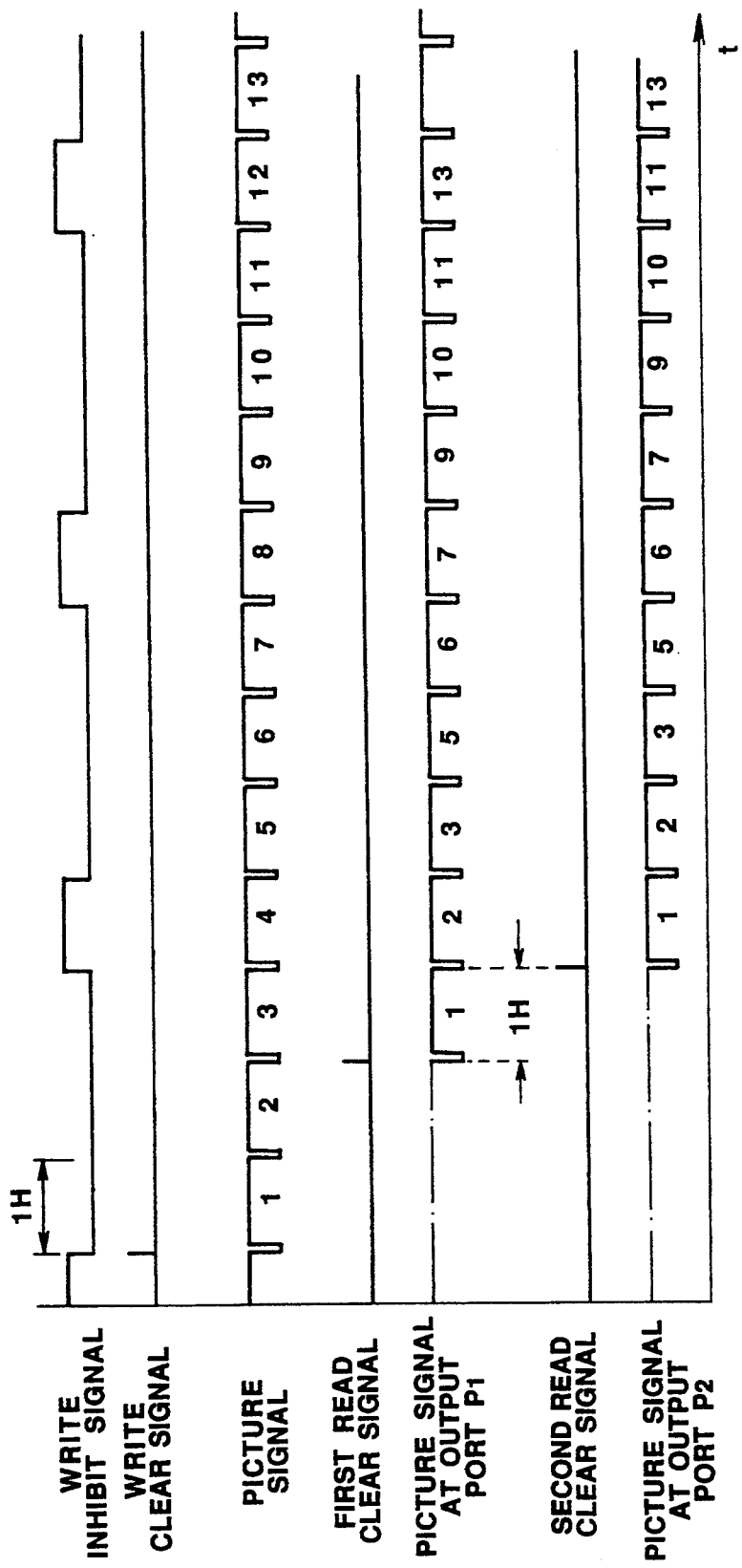

VIDEO SIGNAL CONVERSION SYSTEM WITH A VERTICAL ENHANCEMENT CIRCUIT

BACKGROUND OF THE INVENTION

The present invention relates to a picture signal processing circuit which performs a frequency conversion and an aspect ratio conversion by rising a picture memory such as a field memory, and which processes a converted picture signal to perform line to line operations in the vertical direction.

One example of the picture processing circuit is a converting circuit used in a MUSE-NTSC converter for the MUSE (Multiple Sub-sampling Encode) system proposed by NHK in Japan as an analog HDTV format. A MUSE-NTSC converting circuit shown, as an example, in FIG. 4 is designed to perform frequency conversion and conversion of an aspect ratio on a picture signal which have undergone a simplified MUSE decoder operation, and to perform a vertical enhancement on the converted picture signal.

The converting circuit shown in FIG. 4 includes a field memory 1, a timing generator means 2 and a vertical enhancer circuit 3. The field memory 1 receives the MUSE-decoded picture signal through its input port, and further receives a write clock of 16.2 MHz (fH=16.875 kHz), a read clock of 14 MHz (fH=15.75 kHz), and a write clear signal, a write inhibit signal and a read clear signal of the timing means 2.

The input picture signal is written into the field memory 1 in accordance with the write clock by using the write clear signal as a standard, and the stored picture signal is read out in accordance with the read clock based on the read clear signal. The write operation is inhibited and disabled during the input period of the write inhibit signal. In this way, the picture signal is converted in frequency and aspect ratio, and delivered from an output port of the field memory 1, to the vertical enhancer circuit 3.

The vertical enhancer circuit 3 has a series combination of two line memories 3a and 3a, and an operating section 3b. Picture signals corresponding to three horizontal lines are prepared by the line memories 3a and 3a, and supplied to the operating section 3b. The operating section 3b performs predetermined operations, and provides the output picture signals which have received the vertical enhancement.

This converting circuit requires two of the line memories 3a and 3a in order to obtain the picture signals of three horizontal lines. In general, (n−1) line memories are required in order to obtain picture signals corresponding to n horizontal lines simultaneously.

SUMMARY OF THE INVENTION

It is an object of the present invention to provide a picture signal processing system and method which can reduce the number of line memories required for obtaining picture signals of a plurality of horizontal lines.

According to the present invention, a picture signal processing circuit comprises a picture memory (such as a field memory), a timing means and an operating means (such as a vertical enhancing circuit).

The picture memory comprises an input port for receiving a picture signal, and first and second output ports each of which delivers a stored picture signal independently of the other.

The timing means is for controlling a write clock of said picture memory, and for controlling reading operations through said first and second output ports so that the picture signal delivered from one of said first and second output ports is shifted by one horizontal line interval with respect to the picture signal delivered from the other of said first and second output ports.

The operating means is for receiving the picture signals delivered from said first and second output ports of said picture memory, and for performing an operation between horizontal lines.

In this processing circuit, the picture signal provided from one output port of the picture memory is delayed by one horizontal line with respect to the picture signal provided from the other output port. It suffices therefore to provide (n−2) line memories when the operating means requires picture signals of n horizontal lines.

BRIEF DESCRIPTION OF THE DRAWINGS

FIG. 1 is a block diagram showing a MUSE-NTSC converting circuit according to one embodiment of the present invention.

FIG. 3 is a time chart showing operation of the converting circuit shown in FIG. 1.

DETAILED DESCRIPTION OF THE INVENTION

FIGS. 1-3 show a picture signal processing circuit according to one embodiment of the present invention. The processing circuit of this example is a converting circuit for MUSE-NTSC conversion.

The MUSE-NTSC converting circuit shown in FIG. 1 includes at least a picture memory 1, a timing generator means 2 and an operating circuit 3. In the illustrated example, the picture memory 1 is in the form of a field memory, and the operating circuit 3 is a vertical enhancing circuit.

The field memory 1 of this example has an input port (write port), and first and second output ports (read ports) P1 and P2 which are distinct and independent so that information can be read out independently. The input port is adapted to receive a picture (video) signal which has undergone a simplified MUSE decoding operation. The field memory 1 further receives a write clock of 16.2 MHz (fH=16.875 kHz) for MUSE, and a read clock of 14 MHz (fH=15.75 kHz) for NTSC. The write address and the read address are counted up, respectively, in accordance with the write clock and the read clock.

The timing generator means (or circuit) 2 receives horizontal and vertical synchronizing signals. In accordance with these sync signals, the timing means 2 delivers a write clear signal, a write inhibit (or disable) signal, a first read clear signal and a second read clear signal, to the field memory 1. The write clear signal is provided in synchronization with the vertical sync signal. The write inhibit signal is periodically produced for every fourth horizontal line, as shown in FIG. 3. The first and second read clear signals are provided in synchronization with the vertical sync signal. The output of the second read clear signal is delayed by one horizontal line with respect to the output of the first read clear signal, as shown in FIG. 3. The first read clear signal clears the read address for the first output port P1. The second read clear signal clears the read address for the second output port P2.

Figure 2A:
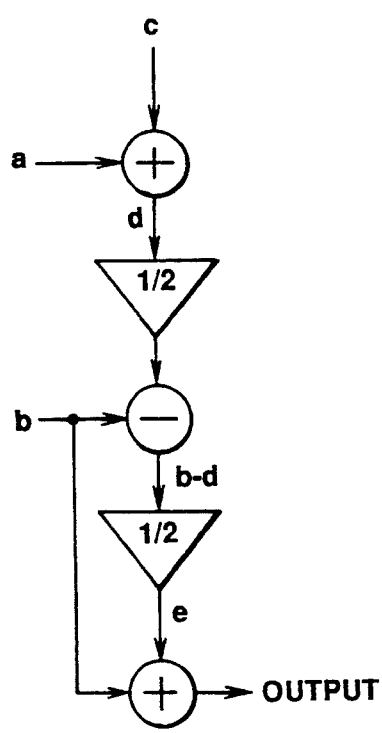
FIG. 2A is a circuit diagram schematically showing an operating section shown in FIG. 1.
Figure 2B:
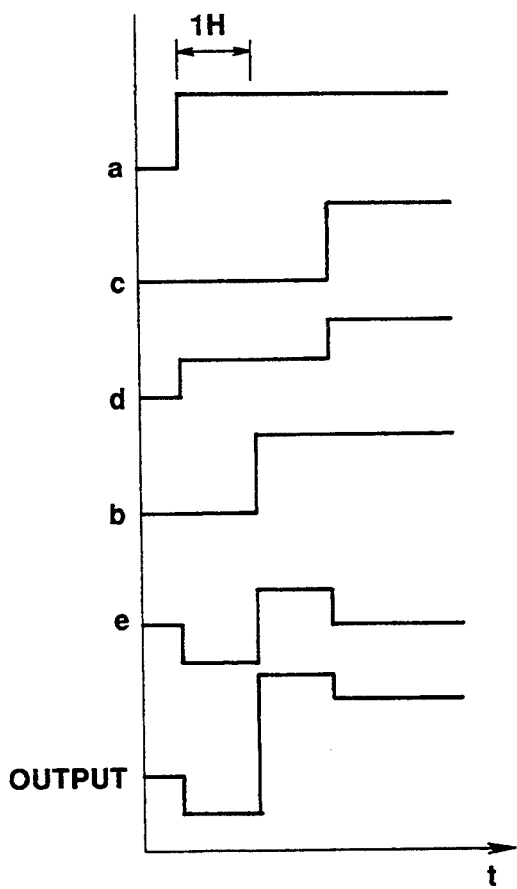
FIG. 2B is a view showing waveforms of signals appearing at various positions shown in FIG. 2A.
Figure 4:
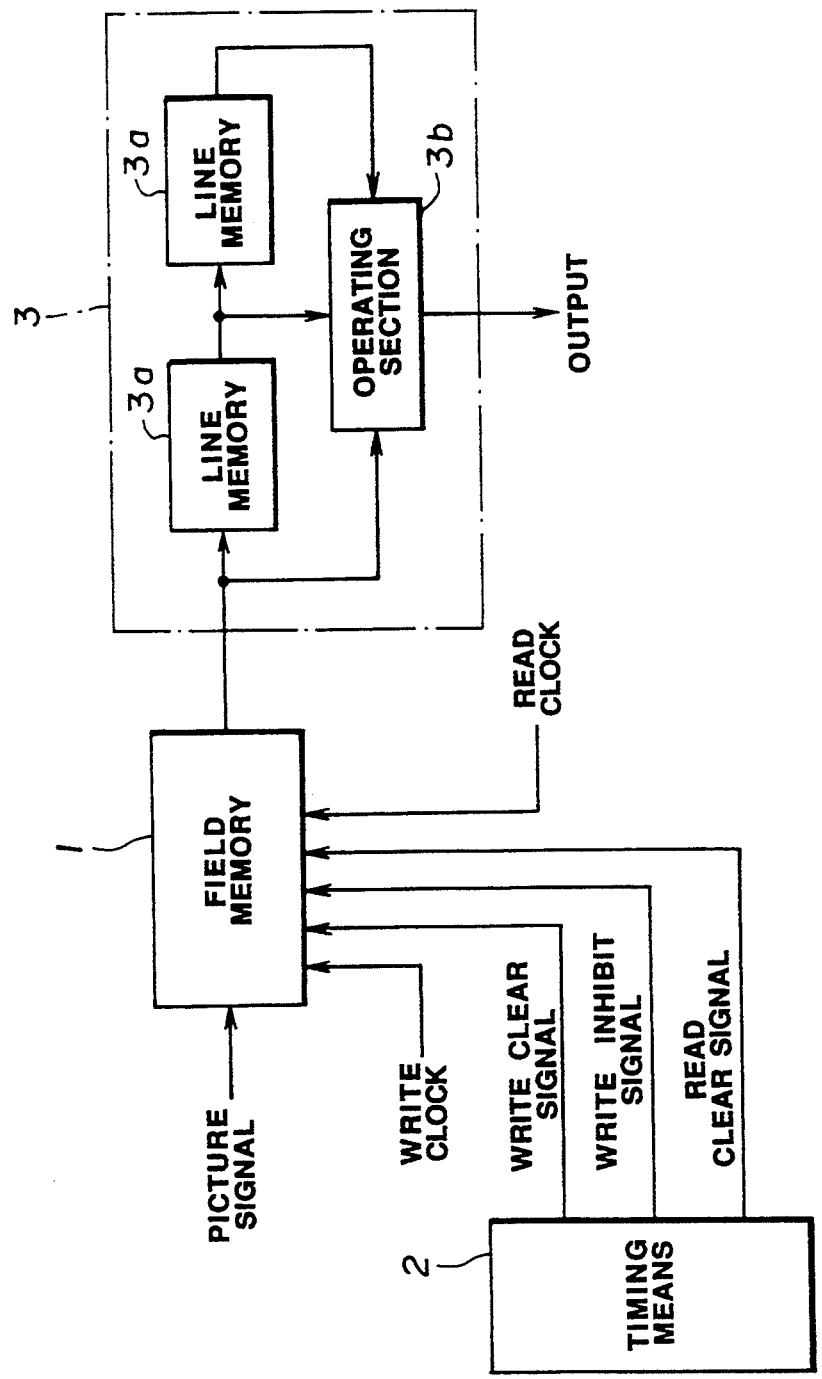
FIG. 4 is a block diagram showing a conventional MUSE-NTSC converting circuit for comparison with the converting circuit according to the present invention.

The vertical enhancer 3 shown in FIG. 1 comprises a line memory 3a and an operating section 3b. The line memory 3a has an input terminal connected with the second output port P2 of the field memory 1, and receives the picture signal from the second output port P2. The operating section 3b has a first input terminal connected with the first output port P1 of the field memory 1, a second input terminal connected with the input terminal of the line memory 3a, and a third input terminal connected with an output terminal of the line memory 3a. The operating section 3b receives the picture signals on the input and output sides of the line memory 3a, and the picture signal outputted from the first output port P1 of the field memory 1. The vertical enhancer 3 has a circuit configuration as shown in FIG. 2A, and produces an output picture signal by performing a vertical enhancement as shown in FIG. 2B.

The thus-constructed picture signal processing circuit of this example is operated as follows.

When the picture signal is supplied to the field memory 1, the picture signal is written in the field memory 1 in such a manner that one horizontal line is eliminated for every four horizontal lines. For example, the fourth, eighth and twelfth lines are eliminated, and the remaining first, second, third, fifth, sixth, seventh, ninth, tenth, eleventh and thirteenth lines are stored. The picture signal is taken out from each of the first and second output ports P1 and P2 in accordance with the corresponding read address cleared by the corresponding one of the first and second read clear signals, as shown in FIG. 3. The writing operation to the field memory 1 is performed in accordance with the MUSE clock frequency whereas the reading operation is performed in accordance with the NTSC clock frequency. At the same time, sections of the input picture signal are eliminated during the writing operation. The field memory 1, therefore, produces the output picture signal whose frequency and aspect ratio are changed.

When the (n−1)st line picture signal is provided from the second output port P2, this picture signal is temporarily stored in the line memory 3a. In the next line period, the second output port P2 supplies the nth line picture signal, the line memory 3a supplies the (n−1)st line picture signal, and at the same time the first output port P1 supplies the (n+1)st line picture signal. In this way, the operating section 3b receives the three picture signals of the three consecutive horizontal lines, and performs the vertical enhancement.

The operating section 3b of this example is the circuit for the vertical enhancement. The operating section of the present invention, however, may take the form of any circuit which performs picture signal processing operations by using a plurality of consecutive horizontal lines. The picture memory of the present invention may be a frame memory or may be some other storage device or storage section for storing picture signals corresponding to two or more lines.

When the operating circuit requires picture signals corresponding to n horizontal lines, the number of the line memories required in the processing circuit according to the present invention is only (n−2). The present invention can reduce the number of the required line memories, and accordingly reduce the required chip size when the IC structure is employed.

What is claimed is:

1. A picture signal processing circuit comprising:
   a picture memory for performing frequency conversion and comprising an input port for receiving a picture signal, and first and second output ports each of which delivers a picture signal stored in said picture memory independent and synchronous of the other of said first or said second output port;
   timing means for controlling a write clock of said picture memory, and for controlling reading operations of stored picture signals at said first and second output ports by controlling read clear signals fed to read address lines of said picture memory, so that a picture signal delivered from one of said first and said second output ports is shifted by one horizontal line interval with respect to a picture signal delivered from the other of said first or said second output port; and
   operating means for receiving picture signals delivered, respectively, from said first and second output ports of said picture memory, and for performing an operation between horizontal lines of said picture signals,
   wherein said operating means comprises a line memory having an input terminal connected with said second output port of said picture memory and an output terminal, and an operating section having a first input terminal connected with said output terminal of said line memory and an output terminal for delivering an output picture signal.

2. A picture signal processing circuit according to claim 1 wherein said operating means comprises a means for performing vertical enhancement of said picture signals.

3. A picture signal converting circuit for processing an input picture signal of a first mode and producing an output picture signal of a second mode, said converting circuit comprising:
   a picture memory for performing frequency conversion and including an input port for receiving said input picture signal, and first and second output ports each of which delivers a picture signal stored in said picture memory independent and asynchronous of a picture signal delivered from the other of said first or said second output port;
   timing mean for controlling a write clock of said picture memory, and for controlling reading operations of stored picture signals at said first and second output ports by controlling read clear signals fed to read address lines of said picture memory, so that said picture signal delivered from one of said first and said second output ports is shifted by one horizontal line period with respect to said picture signal delivered from the other of said first or said second output port; and
   operating means for receiving said picture signals delivered from said first and said second output ports of said picture memory, and for producing said output picture signals by performing an operation between horizontal lines thereof,
   wherein said operating means comprises a line memory having an input terminal connected with said second output port of said picture memory and an output terminal, and an operating section having a first input terminal connected with said output terminal of said line memory and an output terminal for delivering said output picture signal.

4. A MUSE-to-NTSC converter comprising:

a field memory for performing frequency conversion and aspect ratio conversion on an input picture signal, and for producing first and second converted picture signals which are asynchronous with each other;

timing signal generating means for controlling a writing operation of said input picture signal into said field memory, and for controlling reading operations of said first and second converted picture signals from said field memory so that one of said first and said second converted picture signals is shifted by one horizontal line period with respect to the other of said first or said second converted picture signal; and operating means for receiving said first and said second converted picture signals from said field memory, and for producing an output picture signal by processing said first and said second picture signals, wherein said field memory comprises an input port for receiving said input picture signal, and first and second output ports for delivering said first and second converted picture signal, respectively, and said operating means comprises a line memory having an input terminal connected with said second output port of said field memory and an output terminal, and an operating section comprising a first input terminal connected with said output terminal of said line memory and an output terminal for delivering said output picture signal.

5. A converter according to claim 4, wherein said timing signal generating means receives both a vertical synchronizing signal and a horizontal synchronizing signal, and includes means for producing a write clear signal in synchronization with the vertical synchronizing signal, a write inhibit signal which inhibits the writing operation of said field memory in every fourth horizontal line period, and first and second read clear signals in synchronization with the vertical synchronizing signal so that the second read clear signal is delayed by one horizontal line period with respect to the first read clear signal.

6. A converter according to claim 5 wherein said field memory further comprises a first terminal for receiving a write clock signal of a first frequency and a second terminal for receiving a read clock signal of a second frequency different from said first frequency, and four terminals for receiving, respectively, said write clear signal, said write inhibit signal and said first and said second read clear signals.

* * * * *